United States Patent [19]

Hakansson

[11] Patent Number: 4,571,001
[45] Date of Patent: Feb. 18, 1986

[54] FASTENING DEVICE

[76] Inventor: Bengt E. W. Håkansson, Ekgatan 8, S-662 00 Åmål, Sweden

[21] Appl. No.: 618,344

[22] Filed: Jun. 7, 1984

[30] Foreign Application Priority Data

Jun. 28, 1983 [SE] Sweden ............................. 8303683

[51] Int. Cl.⁴ ............................................. A47D 15/00
[52] U.S. Cl. ..................................... 297/483; 297/468
[58] Field of Search ................ 297/483; 280/801, 804, 280/803, 808; 292/269, 277

[56] References Cited

U.S. PATENT DOCUMENTS

| 2,682,737 | 7/1954 | Oehler et al. | 292/277 X |
| 3,368,423 | 2/1968 | Fazekas et al. | 292/277 X |
| 4,135,737 | 1/1979 | Scholz et al. | 280/808 |
| 4,466,666 | 8/1984 | Takada | 297/483 |

FOREIGN PATENT DOCUMENTS

| 2303222 | 8/1974 | Fed. Rep. of Germany | 297/483 |
| 2412253 | 9/1975 | Fed. Rep. of Germany | 280/801 |
| 219783 | 8/1924 | United Kingdom | 292/269 |
| 2078092 | 1/1982 | United Kingdom | 280/801 |

Primary Examiner—William E. Lyddane
Assistant Examiner—José V. Chen
Attorney, Agent, or Firm—Murray, Whisenhunt and Ferguson

[57] ABSTRACT

A fastening device is disclosed for a safety belt in motor vehicles comprising a guiding member to be mounted on the vehicle frame or on some other carrier in the vehicle in such a way that a clearance is created between the guiding member and the carrier and comprising also a runner, to which one end of the safety belt or corresponding organ is attached, and which may be displaced along the guiding member to be positioned in different positions, said positions being determined by a number of holes (9) disposed along the guiding member. The guiding member is a channel-shaped rail (1) with a mid-section (2), which faces said clearance (8) and is provided with said holes (9) and with side flanges (3) projecting perpendicularly from the mid-section. The runner is provided with at least one locking pin (12) to make possible a releasable positioning of the runner by locking in said holes of the rail and at least one to the pin coaxial hole (19) through the back side (18) of the runner in said clearance to be entered by said locking pin in said positions.

11 Claims, 5 Drawing Figures

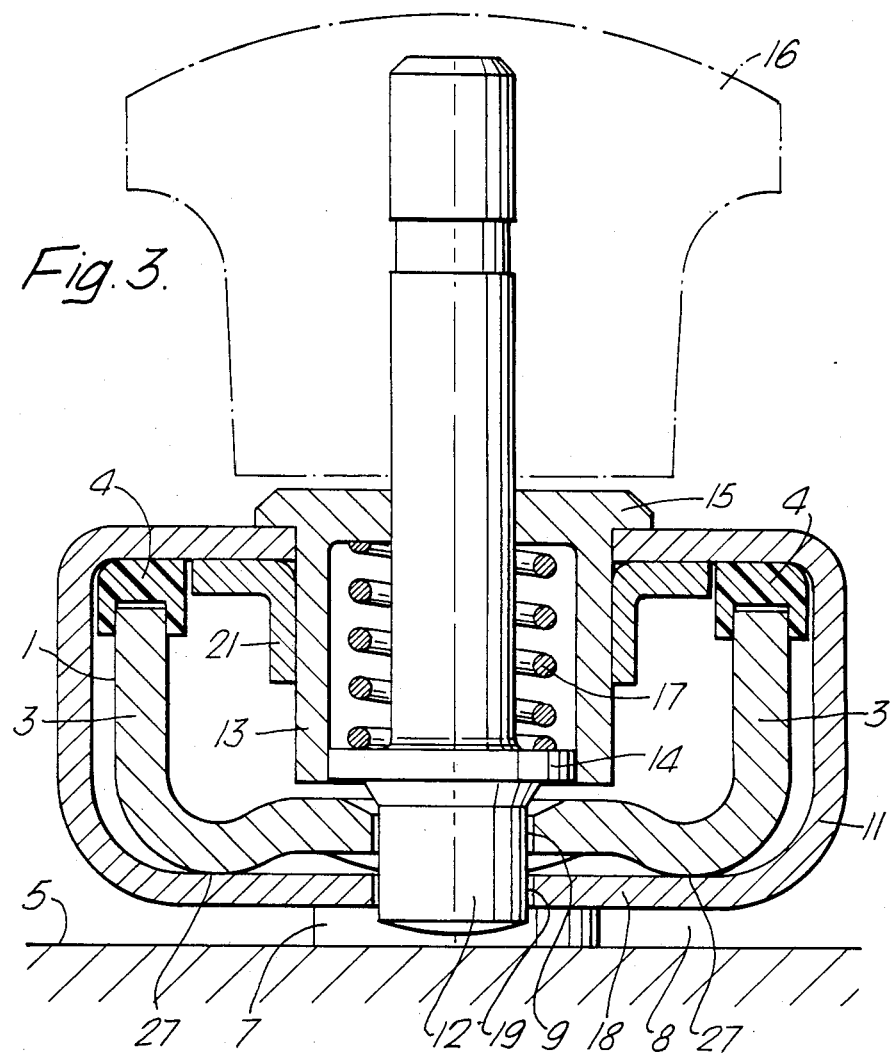
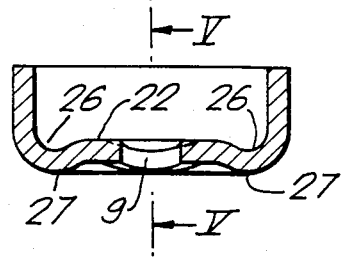 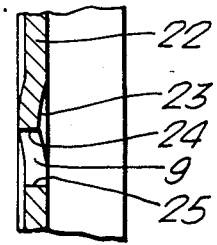

FASTENING DEVICE

FIELD OF INVENTION

The invention relates to an adjustable fastening device. More specifically the invention relates to a fastening device of the type comprising a guide member to be mounted on a vehicle frame or other carrier in such a way that a clearance is formed between the guide member and the carrier, and a runner which may be moved along the guide to be fixed in different positions, as determined by a number of holes dispersed along the guide. Particularly the invention relates to an adjustable fastening device to be mounted in a vehicle, for example an adjustable fastening device for safety belts or for vehicle seats.

PRIOR ART

Fastening devices for safety belts which are attached to the vehicle frame or possibly to a vehicle seat and permit the adjustment of the point of attachment vertically and longitudinally are well known. Such devices are described in the patents U.S. Pat. No. 3,526,431, DE No. 23 03 222, DE No. 24 12 253, DE No. 31 39 624, DE No. 32 15 980, DE No. 25 30 977, and SE No. 387 538.

DESCRIPTION OF THE INVENTION

An object of the invention is to provide an adjustable fastening device to be mounted on the frame of a vehicle, on a vehicle seat, or onto some other carrier, particularly in a vehicle, which is a considerable improvement compared to existing art.

In particular an object is to provide a fastening device of very low mass to meet the growing demand for low weight even of such by themselves comparatively light equipment details as safety belts and the like, which in spite of its low mass has a high tensile strength and a high resistance to deformation.

Yet another object is to provide a fastening device of a simple design, which is easy and cheap to manufacture.

These and other objects are realized by making the guide member channel-formed with its mid-section provided with said holes and adjacent to said clearance, and flanges perpendicular to the mid-section, by making the runner in the form of a sleeve around said member with a rear part of the sleeve in said clearance, by providing the runner with at least one locking pin to make possible a releasable fixation of the runner by locking through said holes of the guide member and by providing the runner with at least one hole, which is coaxial with the locking pin and is located in said rear part of the sleeve in said clearance, through which the locking pin may be pushed to lock the runner in said positions.

According to the preferred embodiment the runner has a cross section, as viewed perpendicularly to the longitudinal direction of the guide rail, which is generally rectangular. Further it has proven suitable to let the runner comprise both said sleeve around the rail, which when a load is applied to the belt distributes the strain over a larger area which is advantageous from the point of view of material strength, and parts which extend inwardly from the flanges of the rail to rib the flanges so that they may withstand even very large lateral loads. In order to make the construction even stronger and increase its ability to withstand strain directed at an angle it may be suitable according to one embodiment of the invention to provide the runner sleeve with parts which fold in inside the flanges of the rail. In this case the sleeve could not be entirely rectangular but rather have a shallow U-shape similar to that of the rail. It is possible also to provide the sleeve with a metal body which would fill the space between the flanges of the rail in order to obtain the increased strength desired. In such a case said metal body would be provided with a guide hole for the locking pin. Otherwise a special guide for the locking pin is provided in that part of the runner which is situated between the flanges of the rail. Further the runner is provided with biasing means for the locking pin so that the locking pin is retained in the desired position.

Different measures may be taken to facilitate the sliding of the runner on the rail in connection with change of position. The rail edges may for example be covered by a slide list made of nylon or some other plastic material, as illustrated in the case of the preferred embodiment. Another way of lowering the friction is to use roller bodies between the rail and the runner, in which case the rollers preferably are journalled in the runner. A third way of lowering the friction is to provide those surfaces of the runner which slide against the rail with nipples.

Another way of lowering friction is to provide the mid-section of the rail with a pair of longitudinal feathers on that side of the rail which faces the clearance, against which the runner may slide. These two feathers are preferably placed close to the two flanges of the rail, creating a flat longitudinal space between the two feathers and a corresponding part of the mid-section which is elevated towards the inner space of the rail. This creates further possibilities and advantages. Firstly, the rail becomes stiffer, with increased resistance to deformation. Further, the holes of the rail may be put in the central elevated part, which makes it possible to combine the holes with countersinks in an advantageous manner.

Further characteristics, aspects, and advantages of the invention will be apparent from the patent claims to follow and of the following description of a preferred embodiment.

SHORT DESCRIPTION OF DRAWINGS

In the following description of a preferred embodiment reference will be made to the attached drawings, in which FIG. 1 is a plan of the fastening device according to the preferred embodiment of the invention, FIG. 2 is a side elevation of the same device, FIG. 3 is a section corresponding to III—III in FIG. 1, FIG. 4 is a section corresponding to IV—IV in FIG. 1, and FIG. 5 is a section corresponding to V—V in FIG. 4.

DESCRIPTION OF A PREFERRED EMBODIMENT

Figure 1:
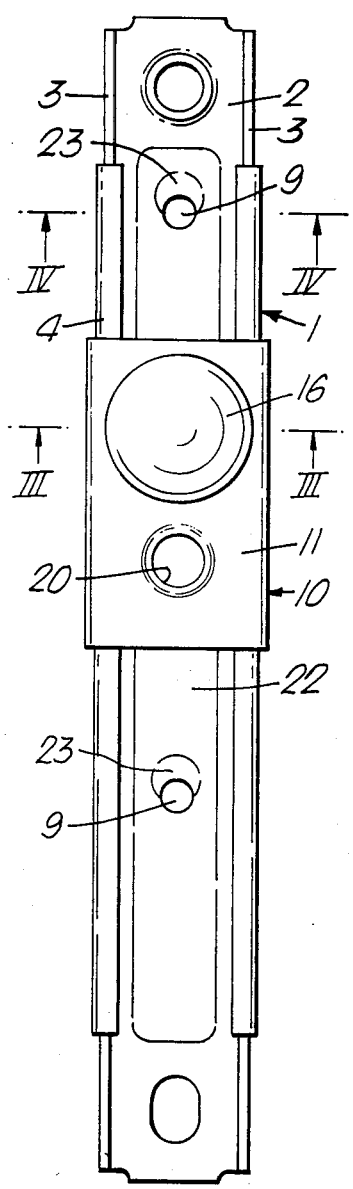
Figure 2:
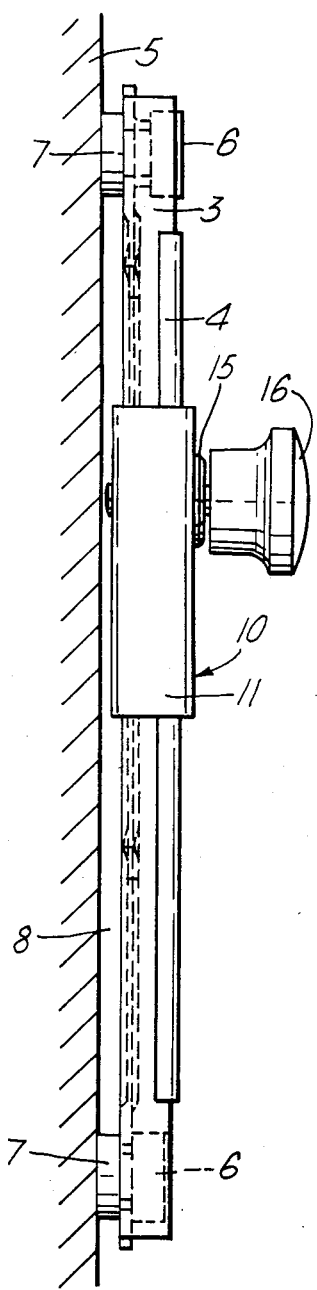

In the drawings a sliding rail is generally designated 1. It consists of a mid-section 2 with two flanges 3. The cross section of the rail 1 in other words is that of a shallow U-beam. The edge of the flanges 3 and their sides are covered by a list 4 of nylon. The rail 1 is attached to a carrier 5 by means of screws 6, FIG. 2. (The carrier 5 and the screws 6 are not shown in FIG. 1.) The carrier 5 may be for example a door post or some other part of the vehicle frame. The carrier 5 may also be a vehicle seat or some organ connected to the vehicle frame or to the vehicle seat. The rail 1 is kept at some distance from the carrier 5 by means of distance bushings 7, creating a clearance 8 between the carrier 5 and the mid-section 2 of the rail 1. The rail 1 is further provided with a number of evenly spaced positioning holes 9 in its mid-section 2.

The mid-section 2 of the rail 1 has a longitudinal central elevation 22, which extends practically along the whole length of the rail. The holes 9 are located in the area of the elevation 22. Close to the holes 9 the material of the rail is depressed to form crescent-shaped recesses 23 above each hole 9 (when the rail 1 is standing vertically, as in FIGS. 1, 2 and 5), in such a way that the upper edge 24 of each of the holes 9 will be at the lower edge of the recess 23 while the lower edge 25 of the hole coincides with the edge of the recess and is level with the elevation 22. The flutes on both sides of the elevation 22 have been designated 26. These flutes 26 correspond to feathers 27 on the opposite side of the mid-section 2 close to the flanges 3 facing the clearing 8.

A runner has been generally designated 10. It consists of a sleeve 11 encasing the rail 1, and of parts inside the sleeve 11 between the flanges 3 of the rail. These latter parts comprise a locking pin or peg 12, the diameter of the front end of which is smaller than that of the holes 9 in the rail 1 and which is located in the plane of symmetry of the device, making it possible to enter the front end of the pin 12 into the hole in the locking positions. Further, there is a guide 13 in the form of a muff which is pressed into a collar 21 which is directed downwards and has been welded to the inside of the sleeve 11. The pin 12 has a flange 14, which may slide inside the muff 13. A grip handle is designated 16. Between the flange 14 and the cover 15 of the muff 13 there is a spiral spring 17, pressing the locking pin 12 through the positioning holes 9 at the time of locking.

At the back side 18 of the sleeve 11, i.e. that side which runs in the clearance 8, there is also a hole 19 for the locking pin 12. When the device is locked, as in FIG. 3, the front end of the locking pin 12 consequently enters both one of the holes 9 in the mid-section of the rail 1 and the hole 19 in the back side 18 of the runner 10.

On the front side of the runner 10 the sleeve 11 is provided with a hole 20 for mounting one end of a safety belt or for mounting a safety belt retracting device.

When the runner 10 is to be moved from one position to another, the grip 16 is lifted, compressing the spring 17 and retracting the front end of the locking pin 12 from both the hole 19 of the sleeve 11 and the hole 9 of the rail 1, the flange 14 on the locking pin 12 sliding inside the guiding muff 13. The runner 10 may then be moved along the rail 1 with the back side 18 of the sleeve 11 sliding against the feathers 27 on the back side of the rail 1 in the area of the clearance 8. Simultaneously, the front of the sleeve 11 slides against the plastic list 4, which functions as a muffler and gives a smooth movement. When the desired position has been reached, the pin 12 is pushed by the spring 17 down into the new hole 9 and is locked by passing also through the hole 19 in the back side 18 of the sleeve 11. If the pin 12 should be released between two holes 9, the runner 10 will fall from its own weight or from the pull of the safety belt downwards along the rail 1. The pin 12 will then enter the first hole 9 which it encounters on its way downwards. The crescent-shaped recess 23 will cause the pin to slide towards the hole 9, pass the upper edge 24 of the hole and be stopped by the lower edge 25 of the hole, at which point the spring 17 pushes the pin 12 into the hole 9 of the rail 1 and subsequently also through the hole 19 in the back side 18 of the sleeve 11.

I claim:

1. A fastening device for adjustably fastening an article to a carrier in one of a plurality of positions relative to said carrier, said device comprising:

elongated runner means, connectable to said article, for supporting said article, said runner means having a longitudinal axis and an axial opening therethrough extending along said longitudinal axis;

track means, having an axis parallel to said runner means axis and axially receivable within said axial opening of said runner means, for slidingly supporting said runner means for axial movement relative to said track means;

connecting means for fixedly connecting said track means to said carrier;

mounting means, operatively connected to said connecting means, for maintaining said track means spaced from said carrier a distance sufficient to provide a clearance for unhindered axial movement of said runner means relative to said track means; and locking means for releasably locking said runner means to said track means in one of said plurality of positions, said locking means comprising means defining a plurality of apertures in said track means, each of said apertures corresponding to one of said plurality of positions;

lock pin means, connected to said runner means, for releasable engagement with one of said plurality of apertures, said lock pin means movable relative to said runner means from a first position to a second position, said lock pin means, when in said first position, receivingly engaged within said aperture and, when in said second position, being removed therefrom;

biasing means for yieldably urging said lock pin means to said first position; and manual actuation means for moving said lock pin means from said first position to said second position to permit relative sliding movement between said runner means and said track means.

2. The fastening device according to claim 1, wherein said track means comprises a channel-shaped rail having a mid-section parallel to said carrier and flanges extending away from said carrier at the sides of said mid-section.

3. The fastening device according to claim 2, wherein said runner means comprises a sleeve member disposed about said channel-shaped rail, said sleeve member having a back portion disposed between said carrier and said mid-section of said rail and a front portion in sliding contct with said rail flanges.

4. The fastening device according to claim 3, wherein the cross-section of said sleeve member perpendicular to its axis is generally rectangular.

5. The fastening device according to claim 3, wherein said front portion has a first aperture therethrough having an axis transverse to said sleeve member axis, and said back portion has a second aperture therethrough coaxial with said first aperture, said first and second apertures alignable in turn with said plurality of apertures in said rail; said lock pin means slidingly receivable within said first and second apertures, said lock pin means, when in said first position, received within said first and second apertures and, when in said second position, received within said first aperture and remote from said second aperture.

6. The fastening device according to claim 5, further comprising guide means for guiding said lock pin means from said first aperture to said second aperture.

7. The fastening device according to claim 6, wherein said lock pin means comprises a lock pin having a first end and a second end and an axis transverse to said sleeve axis, said lock pin including a flange portion extending radially outward from said lock pin axis intermediate said first and second ends; said guide means comprising an annular cylinder member coaxially received within said first aperture, said annular cylinder member having an open and a closed end, said open end disposed proximate said second aperture, said closed end having an aperture therethrough slidingly receivable of said first end of said lock pin, said annular cylinder being slidably receivable of said flange portion of said lock pin; said biasing means disposed within said annular cylinder intermediate said closed end and said flange portion of said lock pin.

8. The fastening device according to claim 3, wherein said channel-shaped rail has a longitudinally extending elevation along its mid-section and, on each side thereof a longitudinal flute, said flutes corresponding to a pair of longitudinal elevations on the side of said rail opposite said rail flanges.

9. The fastening device according to claim 8, wherein said plurality of apertures are formed in said longitudinally extending elevation.

10. The fastening device according to claim 8, wherein front portion of said sleeve slidingly contacts said rail flanges and said back portion of said sleeve slidingly contacts said pair of longitudinal elevations.

11. The fastening device according to claim 1, further comprising lock pin directing means, formed in said track means, for directing said lock pin means into engagement with an aperture under the influence of said biasing means when said runner means moves axially with respect to said track means.

* * * * *